Patented July 19, 1932

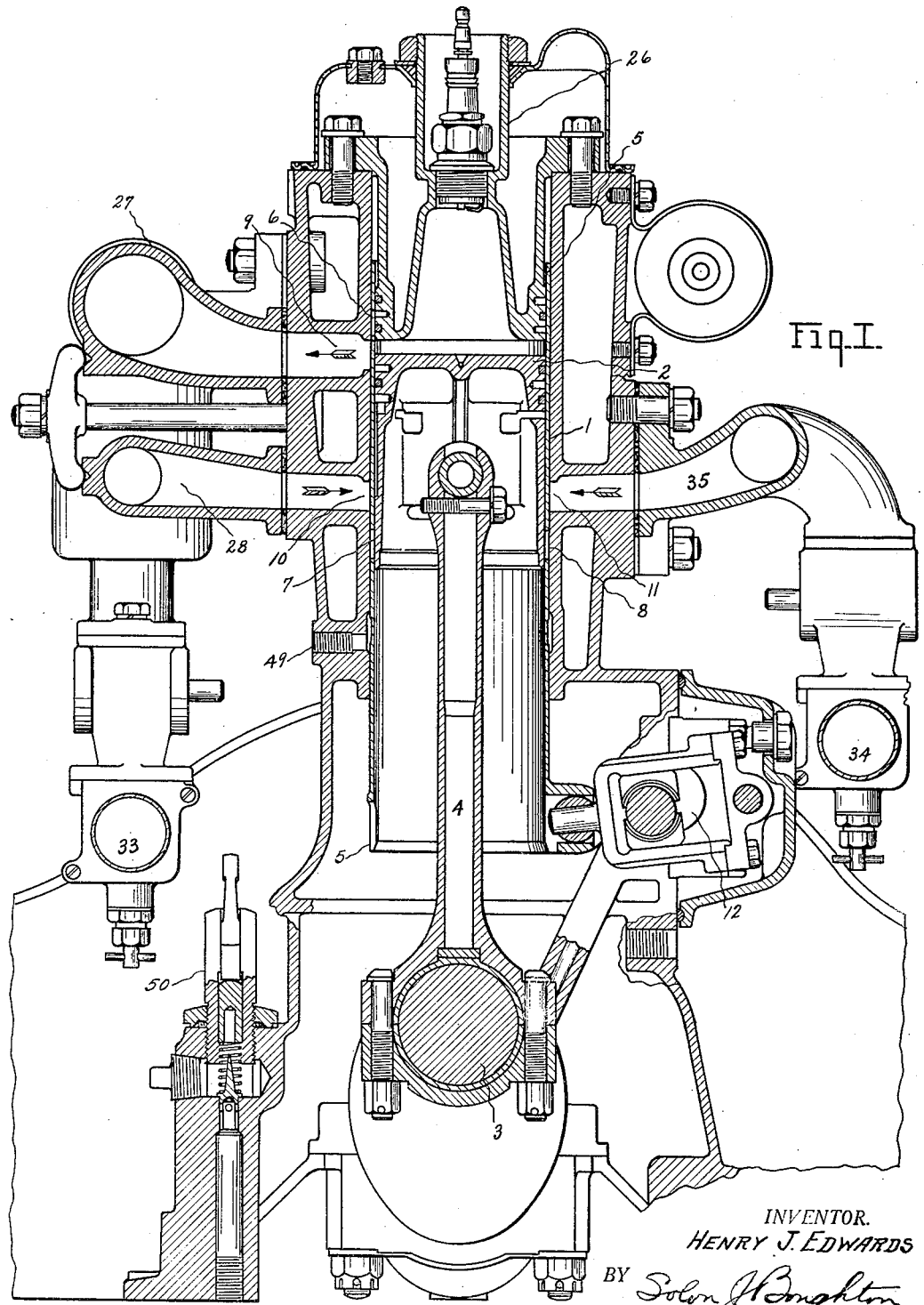

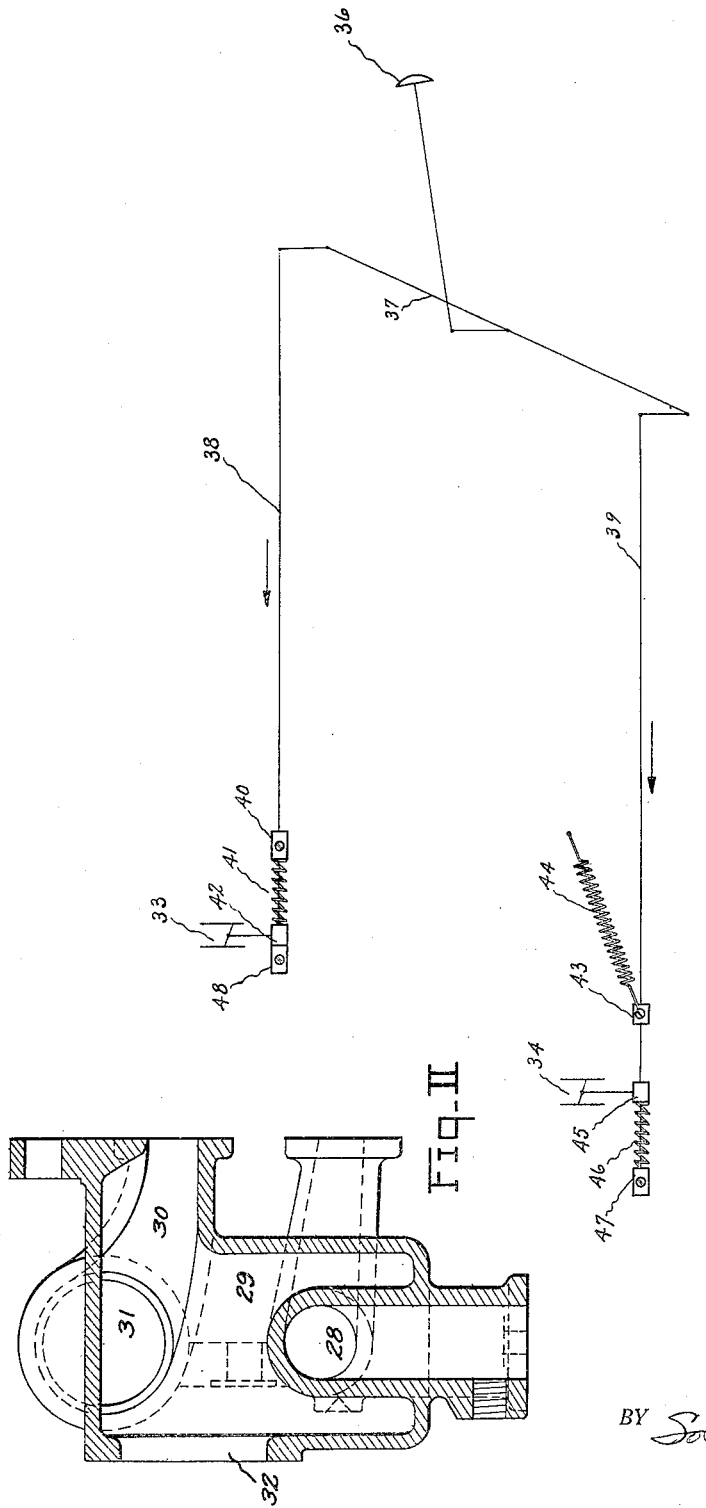

1,868,056

UNITED STATES PATENT OFFICE

HENRY J. EDWARDS, OF TOLEDO, OHIO, ASSIGNOR TO THE WILLYS OVERLAND COMPANY, OF TOLEDO, OHIO, A CORPORATION OF OHIO

SINGLE SLEEVE ENGINE

Application filed November 26, 1926. Serial No. 150,774.

This invention relates to internal combustion engines.

One of the objects of the invention is to provide an engine of the sleeve valve type that will permit the use of high compression without objectionable detonation.

A further object of the invention is to provide an engine that is supplied with fuel through a heated manifold for light loads, and through a supplementary unheated manifold for heavy loads.

Other objects will appear from the description to follow, in conjunction with which for the purposes of the present application, I have embodied one form of the invention in the accompanying drawings in which:

Figure I is a sectional front elevation of an internal combustion engine constructed according to my invention.

Fig. II is an enlarged sectional view of the exhaust manifold and the heated inlet manifold as applied to a multi-cylinder engine.

Fig. III is a diagrammatic view of a suggested means for operating the carburetors progressively.

Referring to the drawings in which like parts are designed by like numerals throughout the views, 1 is an engine cylinder in which reciprocates piston 2 that is connected to crankshaft 3 by connecting rod 4 in the ordinary manner. A reciprocating cylindrical sleeve 5 having ports 6, 7 and 8 is provided between piston 2 and cylinder 1 for controlling the cylinder exhaust port 9 and inlet ports 10 and 11. Sleeve 5 is reciprocated at one-half the crankshaft speed, but with an irregular motion, by means of mechanism attached to eccentric shaft 12, which is driven by the crankshaft 3 in the usual manner.

The present engine may be conveniently operated with but one intake manifold, but as it is desirable to heat the fuel mixture under light load conditions, and to reduce the heat under heavy load conditions, I prefer to use one heated and one unheated manifold. The heated inlet manifold 28 is preferably formed integral with the exhaust manifold 27, and is constructed in a manner to cause all exhaust gas to be conducted into a central passage 29 where it may contact with and heat the inlet manifold. In Fig. II I have shown a section of a manifold adaptable to a multicylinder engine in which the middle cylinders (not shown) discharge the exhaust gases directly into passage 29 by means of passageways 30, and the more remote cylinders (not shown) discharge the gases into conduit 31 which leads them to the common passage 29 and where they may heat the inlet manifold 28 on their way to the outlet opening 32. The fuel entering the engine by means of the heated inlet manifold is delivered into cylinder inlet port 10 from the carburetor 33 which opens by operation of the throttle lever or accelerator prior to the carburetor 34 that feeds the unheated manifold 35. The unheated manifold 35, which because of the cylindrical valve sleeve may be placed at any point on the cylinder circumference, is preferably situated on the side opposite to the exhaust manifold, and delivers its fuel in an unheated condition direct from carburetor 34 to the cylinder 1 by means of cylinder port 11 and sleeve port 8.

A suitable arrangement of carburetor controls is diagrammatically shown in Fig. III, in which 36 represents the ordinary accelerator pedal connected by suitable rods 37, 38 and 39 to the respective carburetors 33 and 34. A collar 40 is fixed to rod 38 for compressing a spring 41 that bears against a block 42 fixed to the carburetor control lever and slidably mounted upon rod 38. A collar 43 is also fixed upon rod 39, to which is secured one end of the accelerator pedal retracting spring 44, the other end of which is secured to a fixed part of the engine or other suitable means. Collar 43 is assembled in spaced relation to the block 45 slidably mounted on rod 39 and secured to the operating lever of carburetor 34. Rod 39 projects slightly beyond the sliding block 45 for supporting spring 46 which normally holds carburetor 34 in its closed position because of the block 47 which is fixed to the engine casing.

Depression of pedal 36 first opens carburetor 33 by the resistance of the spring 41 and permits the fuel mixture to enter the engine through the heated manifold 28, as shown in Fig. I. Collar 43 of rod 39 should be so located that it is in contact with block 45 at substantially the full open position of the carburetor 33 or any other selected position, so that a further depression of pedal 36 will open carburetor 34 and supply additional unheated fuel by means of manifold 35. Carburetor 33 will remain in the open position during the operation of carburetor 34 because of the sliding block 42 which rides on the rod 38 compressing spring 41 without affecting the throttle. When pressure on the accelerator is removed the block 42 returns the throttle valve of carburetor 33 to the closed position by means of the collar 48 which is fixed to the rod 38.

It may, under certain conditions, be found desirable to either withdraw excessive lubricant from the surface of the sleeve or possibly in some cases, wherein the supply of oil is deficient to supply additional lubricant. In order to care for the above mentioned possibilities I have provided a threaded opening 49 that permits the attachment of suitable piping for either withdrawing or supplying lubricant to the surface of sleeve 5. If the supply of lubricant is excessive, opening 49 may be connected to any suction source such as one of the inlet manifolds, or if the oil supply is insufficient the opening may be connected to the usual engine lubrication system.

In Fig. II I have shown at 50 the pressure relief valve of the engine lubrication system, but as the use of similar valves is old in the art and the particular valve used is not closely related to the present invention, its operation need not be described in this application.

It may be seen from the foregoing description that I have provided an engine having a single valve sleeve in which the novel manifold arrangement permits the use of cheap fuels of low volatility without sacrificing volumetric efficiency at the higher engine speeds.

While I have illustrated and described somewhat in detail one embodiment of my invention, it is to be understood that this showing and description are illustrative only, and that I do not regard the invention as limited to the details of construction illustrated and described, except insofar as I have included such limitations within the terms of the following claims.

I claim as my invention:

1. In an internal combustion engine, the combination of an exhaust manifold, an intake manifold heated by said exhaust manifold, an unheated intake manifold, said manifolds having separate discharge openings to said engine, means for supplying fuel to each of said intake manifolds, and means for controlling the fuel supply of said engine comprising a single control for both intake manifolds and adapted to open the heated manifold to the engine prior to the unheated manifold and to subsequently open the unheated manifold to said engine.

2. In an internal combustion engine the combination of an exhaust manifold, an intake manifold adjacent thereto and heated thereby, a second intake manifold having an individual discharge opening secured to said engine at the side opposite to the exhaust manifold means for supplying fuel to said intake manifolds, and a manual control for said intake manifolds for supplying fuel to said engine through the heated manifold exclusively in one position, and to supply fuel to said engine through both of said manifolds in another position of said control.

3. In an internal combustion engine the combination of two separate inlet manifolds communicating with the engine, means for supplying fuel to each of said intake manifolds, a single control for both of said manifolds, each manifold having spaced discharge orifices, one of said manifolds being heated and the other being unheated.

4. In a sleeve valve internal combustion engine the combination of a heated and an unheated inlet manifold, communicating with the engine on opposite sides thereof, and means for progressively controlling the discharge of gases from the respective manifolds, the relation being such that the heated manifold is open prior to the opening of the unheated manifold and closed subsequent to the closing of the unheated manifold.

5. In a sleeve valve internal combustion engine, the combination of an inlet manifold on one side of said engine, a heated inlet manifold on the opposite side of said engine, means for supplying fuel to each of said manifolds comprising independent conduits from said fuel supply to said manifolds, and a single control for both of said intake manifolds so arranged that one of said conduits is effective and the other is ineffective under predetermined conditions, both of said manifolds communicating with an engine cylinder.

In testimony whereof, I affix my signature.

HENRY J. EDWARDS.